United States Patent
Tomomatsu

(10) Patent No.: US 7,058,214 B2
(45) Date of Patent: Jun. 6, 2006

(54) IMAGE PROCESSING APPARATUS, IMAGING PROCESSING METHOD AND STORAGE MEDIUM

(75) Inventor: Yoshiaki Tomomatsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 841 days.

(21) Appl. No.: 09/769,467

(22) Filed: Jan. 26, 2001

(65) Prior Publication Data

US 2001/0010733 A1 Aug. 2, 2001

(30) Foreign Application Priority Data

Jan. 31, 2000 (JP) .......................... 2000-021429
Jan. 31, 2000 (JP) .......................... 2000-021430
Jan. 31, 2000 (JP) .......................... 2000-021434

(51) Int. Cl.
*G06K 9/00* (2006.01)

(52) U.S. Cl. ................... 382/135; 382/137; 382/199; 358/3.28; 283/17

(58) Field of Classification Search ............ 382/135, 382/100, 162, 175; 283/17, 73; 358/3.28, 358/426.01–426.04; 194/4; 209/534; 235/379; 250/201.1; 356/71; 902/7; 380/51, 55; 713/176
See application file for complete search history.

(56) References Cited

U.S. PATENT DOCUMENTS 6,128,401 A * 10/2000 Suzuki et al. ............ 382/135
6,185,404 B1 * 2/2001 Hasuo et al. ............ 399/366
6,289,125 B1 * 9/2001 Katoh et al. ............ 382/194
6,304,966 B1 * 10/2001 Shimizu ................. 713/100
6,393,140 B1 * 5/2002 Itako .................... 382/135
6,542,629 B1 * 4/2003 Wu et al. ............... 382/135
6,567,534 B1 * 5/2003 Rhoads ................... 382/100

FOREIGN PATENT DOCUMENTS

| EP | 0 891 070 A1 | 1/1999 |
|---|---|---|
| EP | 0 892 544 A2 | 1/1999 |
| EP | 0 951 175 A2 | 10/1999 |
| EP | 0 953 938 A2 | 11/1999 |
| EP | 1 017 226 A1 | 7/2000 |
| JP | 7-143335 | 6/1995 |
| KR | 0136042 | 4/1998 |
| WO | WO 94/03997 | 2/1994 |
| WO | WO 98/44719 | 10/1998 |

* cited by examiner

*Primary Examiner*—Barry Choobin
(74) *Attorney, Agent, or Firm*—Fitzpatrick, Cella, Harper & Scinto

(57) ABSTRACT

An image processing apparatus comprises, in order to judge an image prohibited by law from being printed at high speed, a judgment unit for judging for each predetermined area whether or not an output requested image includes information indicating that the image is a judgment object image; and a determination unit for determining the predetermined area for each predetermined distance with respect to the output requested image.

46 Claims, 11 Drawing Sheets

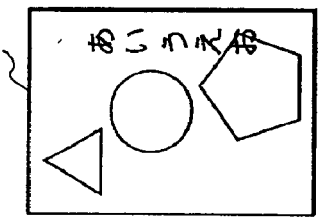
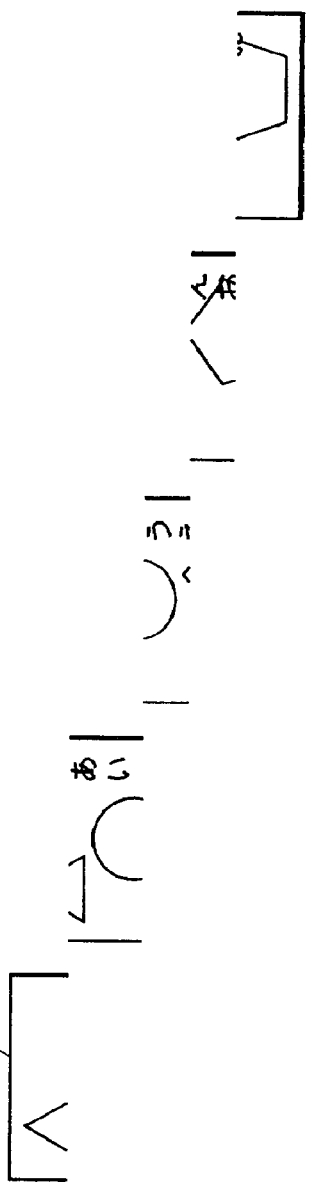
FIG. 6

FIG. 14

| LEFT 0, TOP 0, RIGHT 0, BOTTOM 0 |
|---|
| LEFT 1, TOP 1, RIGHT 1, BOTTOM 1 |
| LEFT 2, TOP 2, RIGHT 2, BOTTOM 2 |
| LEFT 3, TOP 3, RIGHT 3, BOTTOM 3 |

⋮

| LEFT N, TOP N, RIGHT N, BOTTOM N |
|---|

IMAGE PROCESSING APPARATUS, IMAGING PROCESSING METHOD AND STORAGE MEDIUM

BACKGROUND OF THE INVENTION

1. Field of the Invention

The present invention relates to an image processing apparatus, an image processing method, and a storage medium.

2. Related Background Art

In recent years, with performance enhancement of color image forming apparatuses such as a color copier and a color printer, a crime of illegally utilizing the color image forming apparatus to counterfeit paper money, securities, and the like has occurred. A technique of embedding information on a copyright or on limitation of utilization of an image as digital watermark information in a printed image in order to prevent the crime has been presented to the public. In the image forming apparatus, during printing/outputting of image data, it is judged whether the aforementioned identification information is added to an outputted printed matter.

However, in a case in which the image data outputted from an application program is judged, since the image data is finely divided and outputted, once enlarged or reduced in different longitudinal and transverse magnifications by application, and requested to be outputted with a corrected magnification during output, presence/absence of identification information cannot correctly be judged in some cases.

Moreover, the judgment of the presence/absence of the identification information requires a very large processing. Particularly when the judgment is performed in a software processing by a program processing without using expensive hardware, a processing time becomes enormous. Moreover, when a printer unit price is considered, it is difficult in a cost respect to mount the judgment by hardware. However, when the judgment processing retards print time, a product value is unfavorably degraded. Since there is a possibility that a part of the output image includes an object image, all parts of the image need to be subjected to the judgment processing, and a problem occurs that the print processing becomes slow.

Particularly, in recent years, because of enhancement of image resolution, a larger problem has further occurred.

SUMMARY OF THE INVENTION

An object of the present invention is to provide an image processing apparatus, an image processing method, and a storage medium which can solve at least one of the aforementioned problems.

To achieve the aforementioned object, according to the present invention, there is provided one preferred embodiment comprising: a judgment unit for judging for each of predetermined areas whether or not an output requested image includes information indicating a judgment object image; and a determination unit for determining the predetermined area for each predetermined distance with respect to the output requested image.

Moreover, to achieve the aforementioned object, according to the present invention, there is provided one preferred embodiment comprising: a judgment unit for judging for each of predetermined area whether or not an output requested image to be supplied by a unit of a band includes information indicating a judgment object image; and a determination unit for determining the predetermined area for each predetermined distance with respect to the output requested image.

Furthermore, to achieve the aforementioned object, according to the present invention, there is provided one preferred embodiment comprising: a judgment unit for judging whether drawing data is image data; and a judgment unit for, when as a result of judgment by the judgment unit the drawing data is the image data, judging whether or not the image data includes information indicating a judgment object image.

The present invention relates to an image processing apparatus having an inventive function, an image processing method, and a storage medium.

Further functions and characteristics of the present invention will be apparent from the following drawings and examples.

BRIEF DESCRIPTION OF THE DRAWINGS

FIG. 6 is a diagram showing a processing of dividing a page image into a plurality of bands.

FIG. 14 shows an example of storage information when an image area is stored in a rectangular shape.

DETAILED DESCRIPTION OF THE PREFERRED EMBODIMENTS

First Embodiment

A first embodiment will be described hereinafter with reference to the accompanying drawings.

Figure 1:
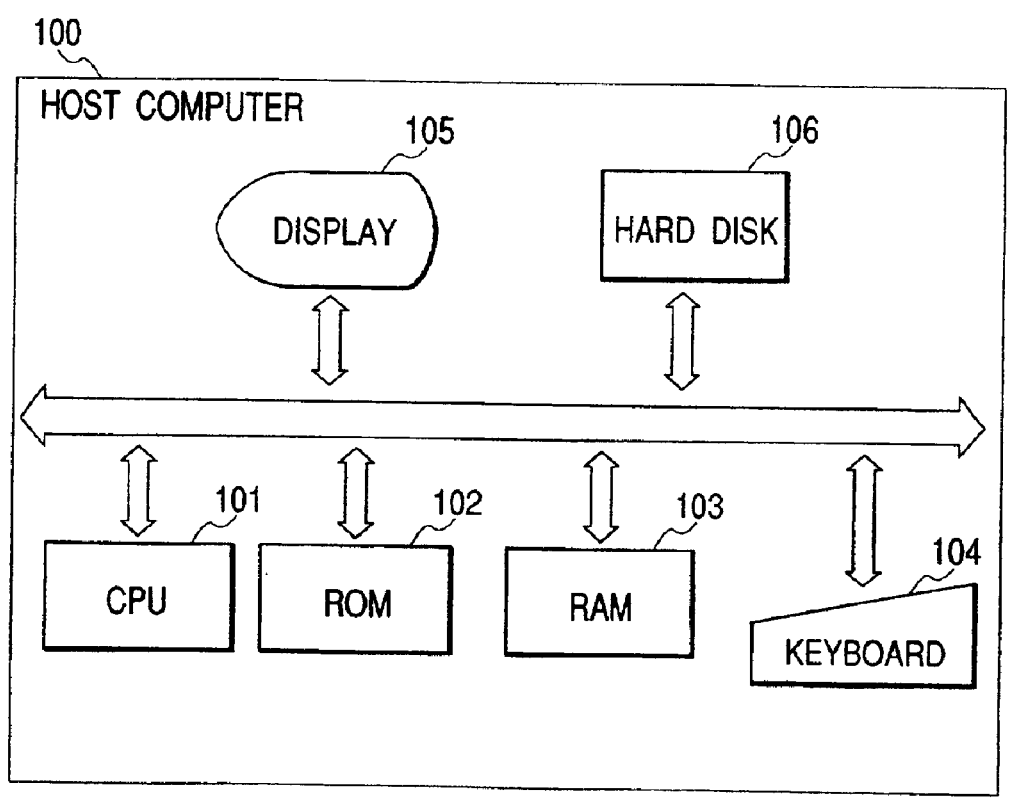
FIG. 1 is a block diagram for realizing a first embodiment.

FIG. 1 shows an example of a block diagram for realizing a processing in the first embodiment.

In a host computer 100, a CPU 101, ROM 102, RAM 103, keyboard 104, display 105, and hard disk 106 are connected to one another via a system bus.

The CPU 101 uses the RAM 103 as a work area and executes a program to execute a flowchart stored in the ROM 102, and is involved in all processings.

The ROM 102 stores the aforementioned program. The RAM 103 is used as a main memory and work area. The keyboard 104 is used to issue a command. The display 105 is used to display a processing result, and the like.

When application program or the like requests a printer to output image data, data is outputted to the printer via a printer driver on the host computer.

In order to prevent a crime of illegally utilizing the printer to counterfeit images of paper money, securities, and the like which are prohibited by law from being printed, in the printer driver it is necessary to judge whether the output requested image data includes digital watermark information, information for specifying the paper money and securities and other identification information by a software processing. Additionally, the digital watermark may be any digital watermark for embedding invisible information in an image specific frequency, or embedding information in an image by color which is not easily visible (e.g., yellow). Moreover, another identification information may be used.

Figure 2:
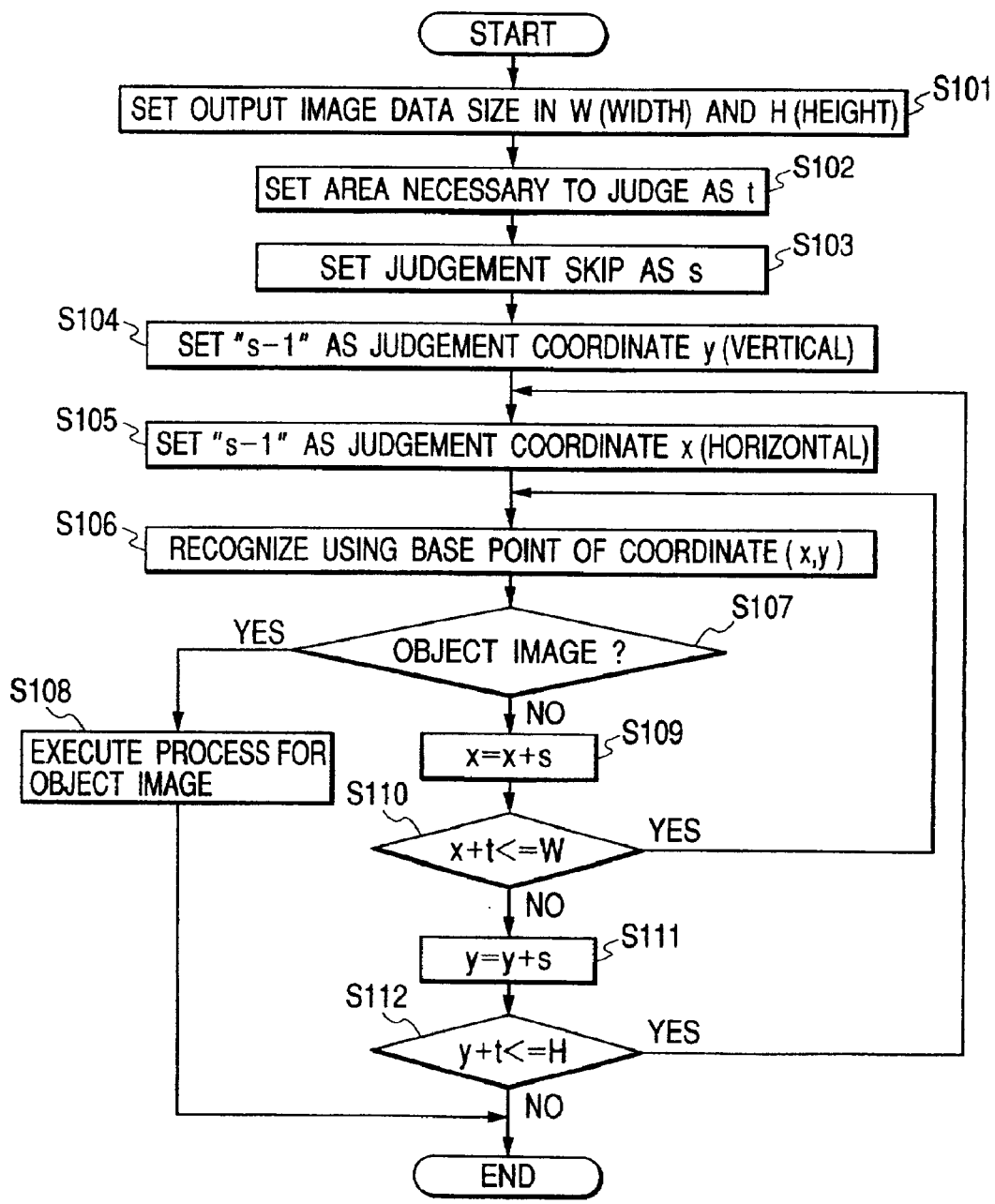
FIG. 2 is a flowchart showing a judgment processing for judging whether image data requested to be outputted includes identification information.

FIG. 2 is a flowchart showing a judgment processing for judging whether the output requested image data includes the identification information. In response to a request for output of the image data, in S101 the printer driver sets height and width of the output requested image in W and H.

In order to reduce judgment mistake, the identification information is periodically included in the entire surface of a judgment object image (the aforementioned image prohibited by law from being printed), and the judgment can be performed from an area of a specific range of an arbitrary place in the image. The area required for the judgment is determined by a judgment module for use.

In S102 a minimum necessary area for recognition/judgment is set as t. The area t is an area which includes at least one piece of the identification information.

Since the counterfeited image is sometimes included in a part of the output requested image with a changed angle, judgment needs to be performed with respect to a plurality of areas of the image, but speed can be raised by performing judgment on the minimum number of areas. To solve the problem, a skip s between areas is determined in such a manner that even when the judgment object image is rotated by an arbitrary angle, t×t judgment areas are constantly included in the image, and the judgment is performed for each skip s.

One example for obtaining the skip s will be described hereinafter.

Figure 3:
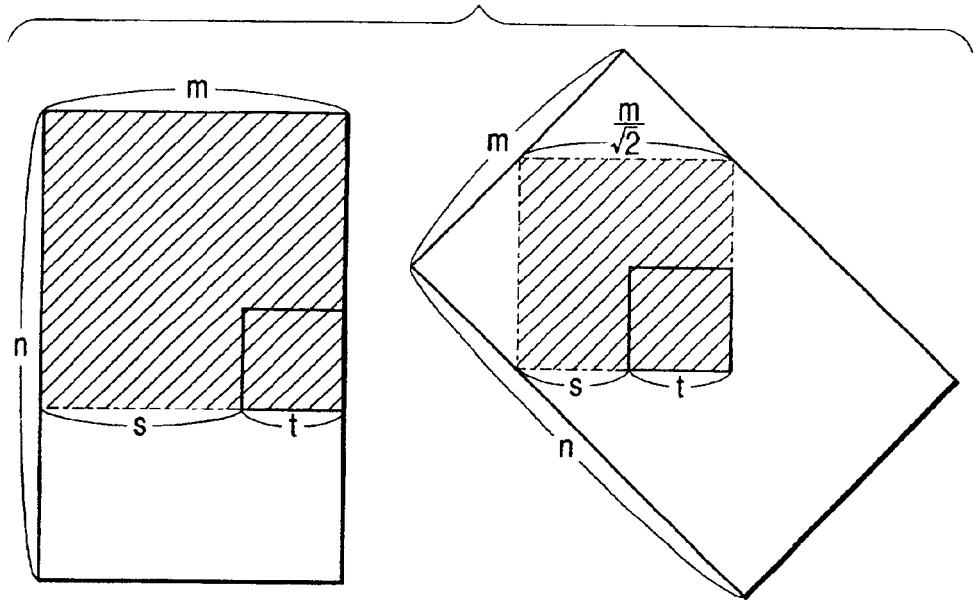
FIG. 3 is a diagram showing a judgment skip.

FIG. 3 is a diagram showing the judgment skip. The judgment can be performed in one place in a slash portion in the drawing.

A size of the judgment object image is set as m, n (m<=n), and m, n indicate the size of the image to be judged. However, when the identification information is not included in the entire surface of the image as the object, instead of the size of the judgment object image, the size of the area including the identification information is set as m, n.

When it is assumed that the image is placed without being rotated as shown in a left-side diagram of FIG. 3 and only a horizontal direction is considered, the judgment cannot be performed with a base point x1 because the image exists in or beyond a range of x1+1. Therefore, the judgment needs to be performed again between x1+1 and x1+1+m. For this, the following is necessary.

$$x1+s+t<=x1+1+m$$

That is to say, the following is necessary.

$$s<=m-t+1$$

Since a larger value of s is effective for speeding up, the following can be obtained.

$$s=m-t+1$$

Similarly in a vertical direction, the following is obtained.

$$s=n-t+1$$

However, from (m<=n), the following results.

$$s=m-t+1$$

Since there is a possibility that the judgment object image is rotated by the arbitrary angle, the size can be obtained by the following.

$$s=m/\sqrt{2}-t+1$$

Additionally, when there are a plurality of judgment image types and the size differs (e.g., when a plurality of images of 10000 yen, 100 dollars, and the like are judged), the aforementioned resulting minimum value of each judgment image indicates a skip width, and a much smaller value is sometimes used because of a limitation of a judgment module.

Next, in order to obtain a first judgment coordinate, in S104 s–1 is set as an initial value y of a vertical direction of the judgment coordinate, and in S105 s–1 is set as an initial value x of the horizontal direction of the judgment coordinate.

In S106 coordinate (x, y) is used as a start point to perform the judgment. In S107, in accordance with a result of S106 the processing is branched.

If it is judged as a result that the image is an object image, in S108 a processing for the object image is performed. For example, it is possible to finish the print processing, display a message indicating that printing is impossible to a user, or print a replacement of the image, that is, another image indicating illegal utilization. Thereafter, the entire processing ends.

On the other hand, when a negative result is obtained by the judgment, in S109 s is added to x in order to obtain the next coordinate.

In S110, from a result of S109, it is judged whether the judgment of the output image of the horizontal direction in the vertical direction coordinate y is finished. If the judgment is not finished, the processing is repeated from S106.

On the other hand, when it is judged that the processing ends in the horizontal direction, in S111 the skip s is added to y in order to obtain the next coordinate of the vertical direction. In S112, from a result of S111, it is judged whether the output image judgment of the vertical direction is also finished. If the judgment is not finished, the processing is repeated from S105.

On the other hand, when the judgment of the vertical direction is also finished, it is determined that the judgment of all output images is finished, and the processing is finished.

As described above, according to the first embodiment, since the size (m, n) of the paper money or the securities as the judgment object image is known, an embedding period of the digital watermark information used during judgment of the judgment object image in the judgment object image is known, and an area size (t*t) for obtaining a sufficient judgment precision during judgment of the digital watermark of the judgment object image is experimentally known, the period for the output requested image to judge the digital watermark with the realized sufficient judgment precision (i.e., the period in which at least one area size (t*t) is necessarily extracted from the judgment object image included in the output requested image, when the output requested image is sampled and judged in this period) can be obtained like s.

Therefore, it is possible to use only the image data of the minimum necessary area size and judge whether or not the output requested image includes the judgment object image.

Moreover, when a plurality of judgment object images are simultaneously judged, by using the image data sampled with a maximum area size and minimum period for the respective judgment object images to perform the judgment, the sufficient judgment precision is realized for each of the plurality of judgment object images, and further the judgment is possible at highest speed (with little processing amount).

For the high-speed (little processing amount) judgment, when algorithm is realized, even in a printer apparatus whose unit cost is low and which cannot employ the judgment of the paper money, securities, and the like by expensive hardware, the judgment of the paper money, securities, and the like can be realized in software of a printer driver or the like whose processing speed is slow but whose cost can be suppressed.

Additionally, since with enhancement of the processing speed of the computer CPU, the printer driver processing speed is enhanced, the judgment with higher precision is enabled by shortening the period or enlarging the aforementioned area size.

According to the first embodiment, even when the judgment object image is included in a part of an output printed matter, the image can be judged and the judgment can be speeded up by judging whether identification information is added to the part of the image.

Second Embodiment

Figure 4:
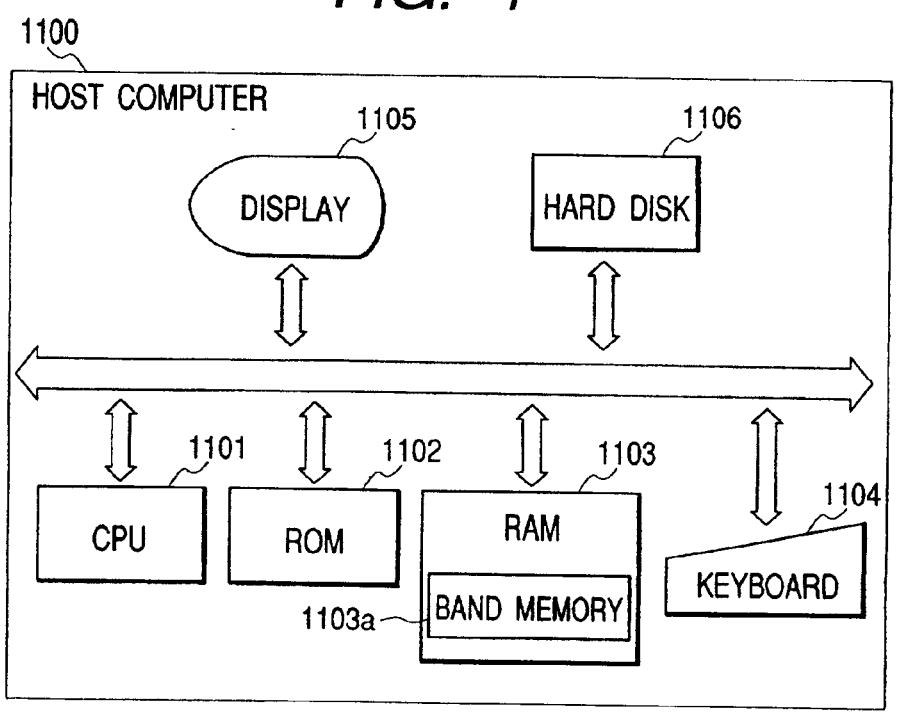
FIG. 4 shows one example of a block diagram for realizing a second embodiment.

A second embodiment will be described hereinafter with reference to the accompanying drawings. FIG. 4 shows an example of a block diagram for realizing the second embodiment. In a host computer 1100, a CPU 1101, ROM 1102, RAM 1103, keyboard 1104, display 1105, and hard disk 1106 are connected to one another via a system bus.

The CPU 1101 uses the RAM 1103 as the work area and executes the program to execute the flowchart stored in the ROM 1102, and is involved in all processings. The ROM 1102 stores the aforementioned program. The RAM 1103 is used as the main memory and work area, and has a band memory 1103a. The band memory 1103a is used to develop data of a target band area into an image. The keyboard 1104 is used to issue the command. The display 1105 is used to display the processing result, and the like.

In a so-called dam printer, in which on a host computer side, data of a character, image, diagram, and the like are developed in the image in accordance with a printer resolution in the RAM 1103 in the host computer and subsequently sent to the printer, usually as shown in FIG. 6, the printer driver disassembles a page image 1301 into a plurality of band images 1302, and develops the data belonging to a target band in the band memory 1103a of the RAM 1103 with the image in accordance with the printer resolution. Thereafter, the data of the band memory 1103a is outputted to the printer.

In order to prevent the crime of illegally utilizing the printer to counterfeit the images of paper money, securities, and the like which are prohibited by law from being printed, in the printer driver it is necessary to judge whether the output requested image data includes the digital watermark information, information for specifying the paper money and securities and other identification information by the software processing. Additionally, the digital watermark may be any digital watermark for embedding the invisible information in the image specific frequency, or embedding the information in the image by the color which is not easily visible (e.g., yellow). Moreover, another identification information may be used.

Figure 7:
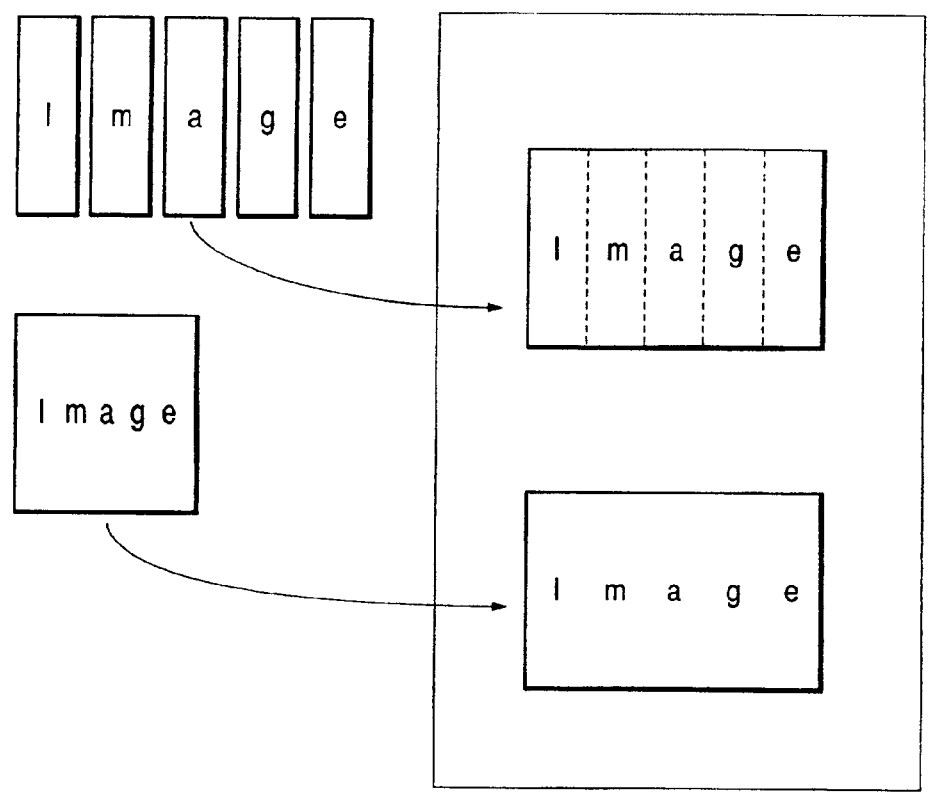
FIG. 7 is a diagram showing that image data is divided, or once enlarged/reduced in different longitudinal and transverse magnifications and outputted.

However, during output from the application program, as shown in FIG. 7, the image data is finely divided and outputted, once enlarged or reduced in different longitudinal and transverse magnifications by application, and requested to be outputted in a corrected magnification during output. In this case or another case, correct judgment is impossible depending on a judgment module. However, even in this case, since in the image data developed in the band image, the disassembled image is synthesized, and the image data enlarged or reduced in the different longitudinal and transverse magnifications is developed in the corrected image, it is possible to perform the judgment processing.

Figure 5:
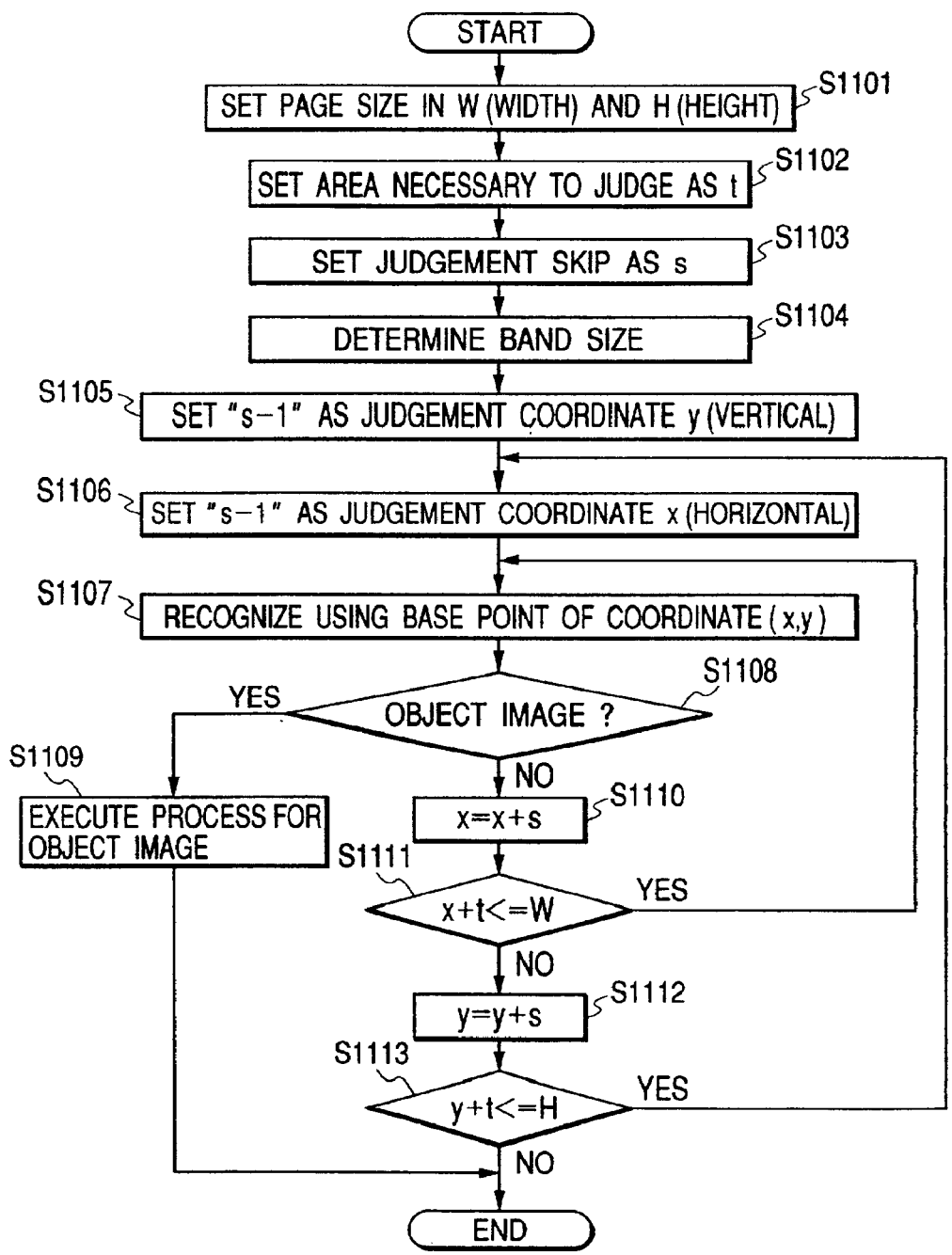
FIG. 5 is a flowchart showing a judgment processing for judging whether image data developed in a band memory includes identification information.

FIG. 5 is a flowchart showing the judgment processing for judging whether the image data developed in the band memory includes the identification information. First in S1101 the printer driver sets height and width of a page print area in W and H. In order to reduce the judgment mistake, information necessary for the judgment (the aforementioned identification information) is periodically included in the entire surface of the judgment object image, and the judgment can be performed from the area of the specific range of the arbitrary place in the image. The area required for the judgment is determined by the judgment module for use. In S1102 the minimum necessary area for judgment is set as t. The area t is an area which includes at least one piece of the identification information. When the image developed in the band memory is judged, it is also possible to judge all areas. However, depending upon the judgment module, the judgment can be performed in a partial area in judgment object image data. In this case, it is also possible to determine a skip s between the areas for performing the judgment for speeding up and perform the judgment for each s.

Figure 8:
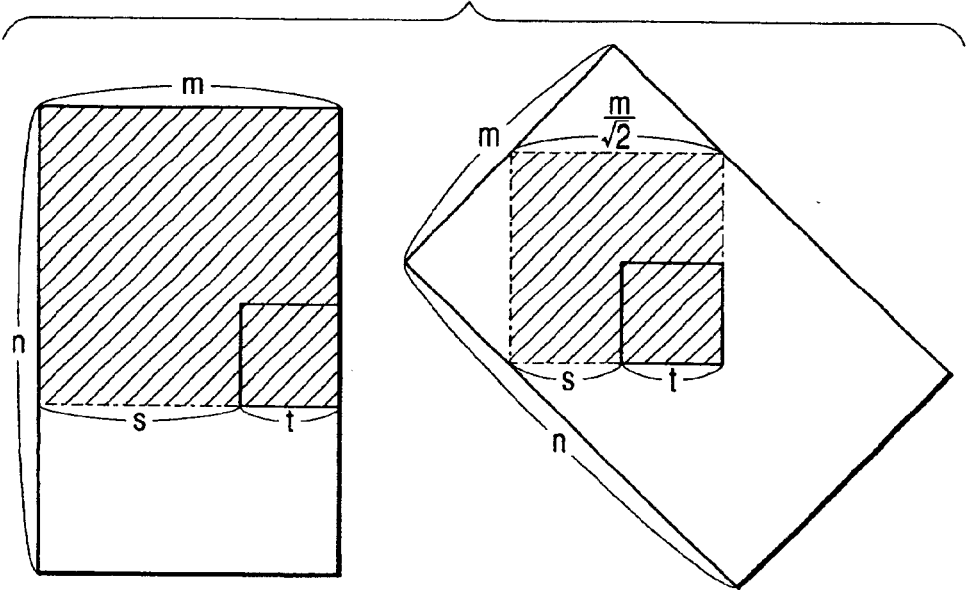
FIG. 8 is a diagram showing one example of the judgment skip.

One example for obtaining the skip s will be described hereinafter. FIG. 8 is a diagram showing one example of the judgment skip. When judgment area t×t is included in the slash portion in the drawing, the judgment is possible. The size of the judgment object image is set as m, n (m<=n), and m, n indicate the size of the image to be judged. However, when the identification information is not included in the entire surface of the image as the object, instead of the size of the judgment object image, the size of the area including the identification information is set as m, n. Since there is a possibility that the judgment object image is rotated by the arbitrary angle, the size can be obtained by the following.

$$s = m/\sqrt{2} - t + 1$$

Additionally, when there are a plurality of judgment image types and the size differs (e.g., when a plurality of images of 10000 yen, 100 dollars, and the like are judged), the aforementioned resulting minimum value of each judgment image is s. Moreover, a much smaller value is sometimes used because of the limitation of the judgment module. When all areas have to be judged, the skip s is 1.

Next, in order to avoid a situation in which the judgment area t×t becomes a band boundary and the judgment becomes impossible, a band size is determined in such a manner that the judgment area t×t does not become the band boundary. Since the band size cannot be changed for each band depending upon the system, in S1104, for example, a band size which satisfies the following condition in all bands in a page is determined.

Band boundary<=(s−t)+s*(N−1) (N=number of bands in page 1, 2, 3)

Alternatively, the following is used.

s*N<=band boundary (N=number of bands in page 1, 2, 3)

Instead of processing and judging the data of the area t×t at once, the judgment module can sometimes judge a plurality of divided portions. In this case, in accordance with the condition, a judgment standard is changed.

Subsequently, in order to obtain the first judgment coordinate, in S1105 S−1 is set as the initial value y of the vertical direction of the judgment coordinate, and in S1106 s−1 is set as the initial value x of the horizontal direction of the judgment coordinate. In S1107 the coordinate (x, y) is used as the start point to perform the judgment. In S1108, in accordance with the result of S1107 the processing is branched. If it is judged as a result that the image is an object image, in S1109 the processing for the object image is performed. For example, the message indicating that printing is impossible is displayed to the user and the print processing is finished. Thereafter, the entire processing ends.

On the other hand, when the negative result is obtained by the judgment, in S1110 s is added to x in order to obtain the next coordinate. In S1111, from a result of S1110, it is judged whether the judgment of the output image of the horizontal direction in the vertical direction coordinate y is finished. If the judgment is not finished, the processing is repeated from S1107.

On the other hand, when it is judged that the judgment in the vertical direction coordinate y is finished, in S1112 the skip s is added to y in order to obtain the next coordinate of the vertical direction. In S1113, from a result of S1112, it is judged whether the output image judgment of the vertical direction is also finished. If the judgment is not finished, the processing is repeated from S1106. On the other hand, when the judgment of the vertical direction ends, it is determined that the judgment of all output images is finished, and the processing is finished.

In S1104, a system in which the band size cannot be changed midway in the page has been described, but it is possible to change the band size even midway in the page in some system. In this case, instead of determining the band size in the beginning of the page, it is judged for each band whether the area t×t overlaps the band boundary. When the area overlaps the boundary, the judgment can be performed by changing the band size.

As described above, according to the second embodiment, since the size (m, n) of the paper money or the securities as the judgment object image is known, the embedding period of the digital watermark information used during judgment of the judgment object image in the judgment object image is known, and the area size (t*t) for obtaining the sufficient judgment precision during judgment of the digital watermark of the judgment object image is experimentally known, the period for the output requested image to judge the digital watermark with the realized sufficient judgment precision (i.e., the period in which at least one area size (t*t) is necessarily extracted from the judgment object image included in the output requested image, when the output requested image is sampled and judged in this period) can be obtained like s.

Therefore, it is possible to use only the image data of the minimum necessary area size and judge whether or not the output requested image includes the judgment object image.

Moreover, when a plurality of judgment object images are simultaneously judged, by using the image data sampled with the maximum area size and minimum period for the respective judgment object images to perform the judgment, the sufficient judgment precision is realized for each of the plurality of judgment object images, and further the judgment is possible at highest speed (with little processing amount).

Furthermore, there is a possibility that the judgment cannot be performed when the area t*t overlaps the band boundary, but the band width is determined in such a manner that the area t*t does not overlap the band boundary, and the judgment object image can therefore securely be judged.

Additionally, when the band size can be determined, it is judged for each band whether or not the area t*t corresponds to the band boundary, and the band size is changed, so that the judgment object image can be judged with good precision.

For the high-speed (little processing amount) judgment, when algorithm is realized, even in the printer apparatus whose unit cost is low and which cannot employ the judgment of the paper money, securities, and the like by expensive hardware, the judgment of the paper money, securities, and the like can be realized in software of the printer driver or the like whose processing speed is slow but whose cost can be suppressed.

Additionally, since with enhancement of the processing speed of the computer CPU, the printer driver processing speed is enhanced, the judgment with higher precision is enabled by shortening the period, enlarging the aforementioned area size, or taking another countermeasure.

According to the second embodiment, for example, during output from the application program, the image data is finely divided and outputted, once enlarged or reduced in the different longitudinal and transverse magnifications by application, and requested to be outputted in the corrected magnification during output. Even in this case, the judgment can be realized.

Third Embodiment

A third embodiment will be described hereinafter with reference to the accompanying drawings.

Figure 9:
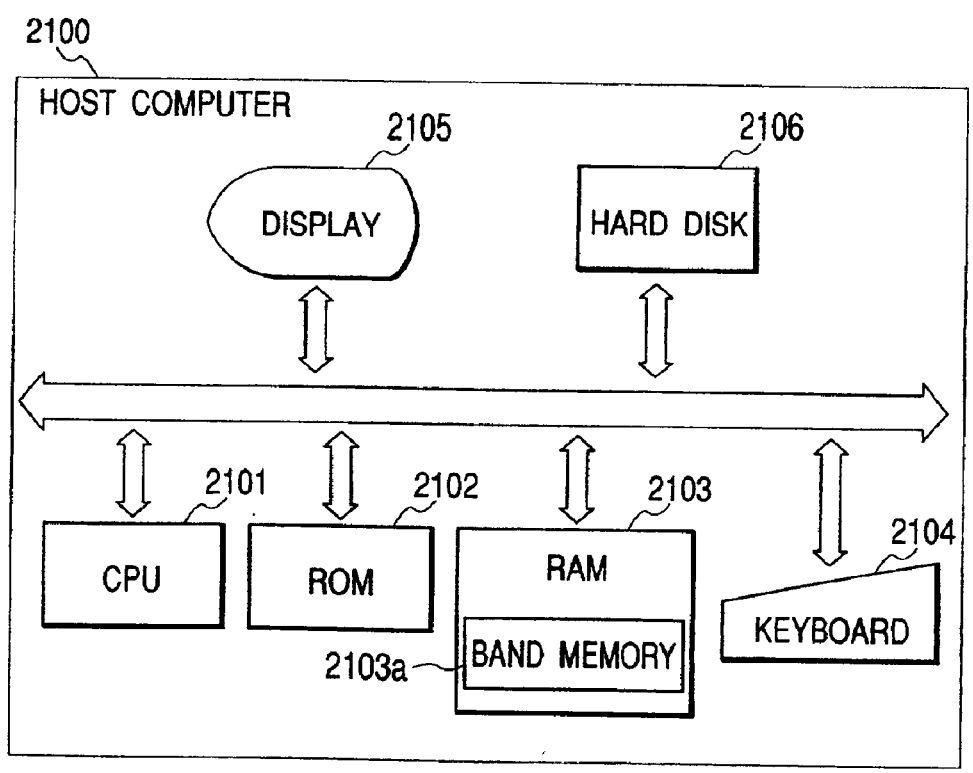
FIG. 9 shows one example of a block diagram for realizing a third embodiment.

FIG. 9 shows an example of a block diagram for realizing a processing in the third embodiment.

In a host computer 2100, a CPU 2101, ROM 2102, RAM 2103, keyboard 2104, display 2105, and hard disk 2106 are connected to one another via a system bus.

The CPU 2101 uses the RAM 2103 as the work area and executes the program to execute the flowchart stored in the ROM 2102, and is involved in all processings. The ROM 2102 stores the aforementioned program. The RAM 2103 is used as the main memory and work area, and has a band memory 2103a. The band memory 2103a is used to develop the target band area data into the image. The keyboard 2104 is used to issue the command. The display 2105 is used to display the processing result, and the like.

Figure 11:
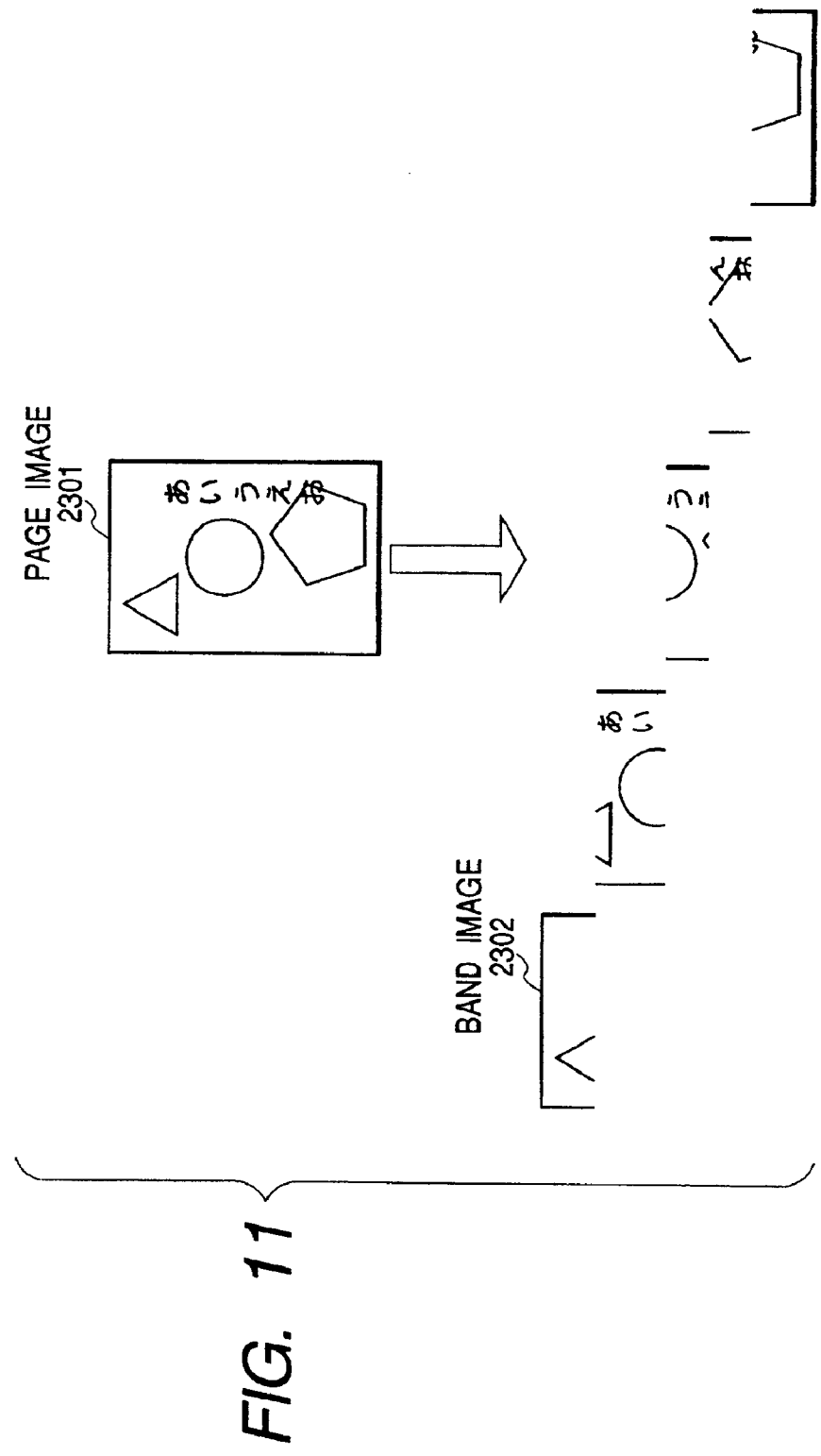
FIG. 11 is a diagram showing a processing of dividing the page image into a plurality of bands.

In the so-called dam printer, in which on the host computer side, the data of character, image, diagram, and the like are once developed in the image in the RAM 2103 and subsequently sent to the printer, usually as shown in FIG. 11, the printer driver disassembles a page image 2301 into a plurality of band images 2302, and develops the data belonging to the target band in the band memory 2103a of the RAM 2103 with the image in accordance with the printer resolution. Thereafter, the data of the band memory 2103a is outputted to the printer.

In order to prevent the crime of illegally utilizing the printer to counterfeit the images of paper money, securities, and the like which are prohibited by law from being printed, in the printer driver it is necessary to judge whether the output requested image data includes the digital watermark information, information for specifying the paper money and securities and other identification information by the software processing. Additionally, the digital watermark may be any digital watermark for embedding the invisible information in the image specific frequency, or embedding the information in the image by the color which is not easily visible (e.g., yellow). Moreover, another identification information may be used.

Figure 12:
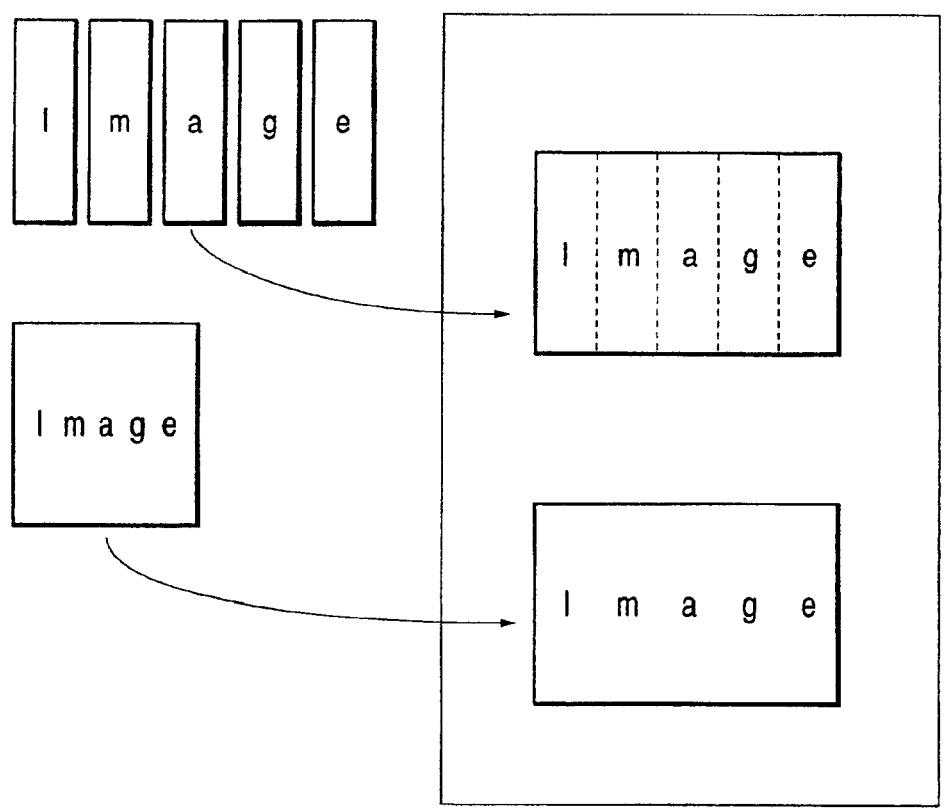
FIG. 12 is a diagram showing that the image data is divided, or once enlarged/reduced in different longitudinal and transverse magnifications and outputted.

However, during output from the application program, as shown in FIG. 12, the image data is finely divided and outputted, once enlarged or reduced in different longitudinal and transverse magnifications by application, and requested to be outputted in a corrected magnification during output. In this case or another case, correct judgment is impossible depending upon the judgment module. However, even in this case, since in the image data developed in the band image, the disassembled image is synthesized, and the image data enlarged or reduced in the different longitudinal and transverse magnifications is developed in the corrected image, it is possible to perform the judgment processing.

Figure 10:
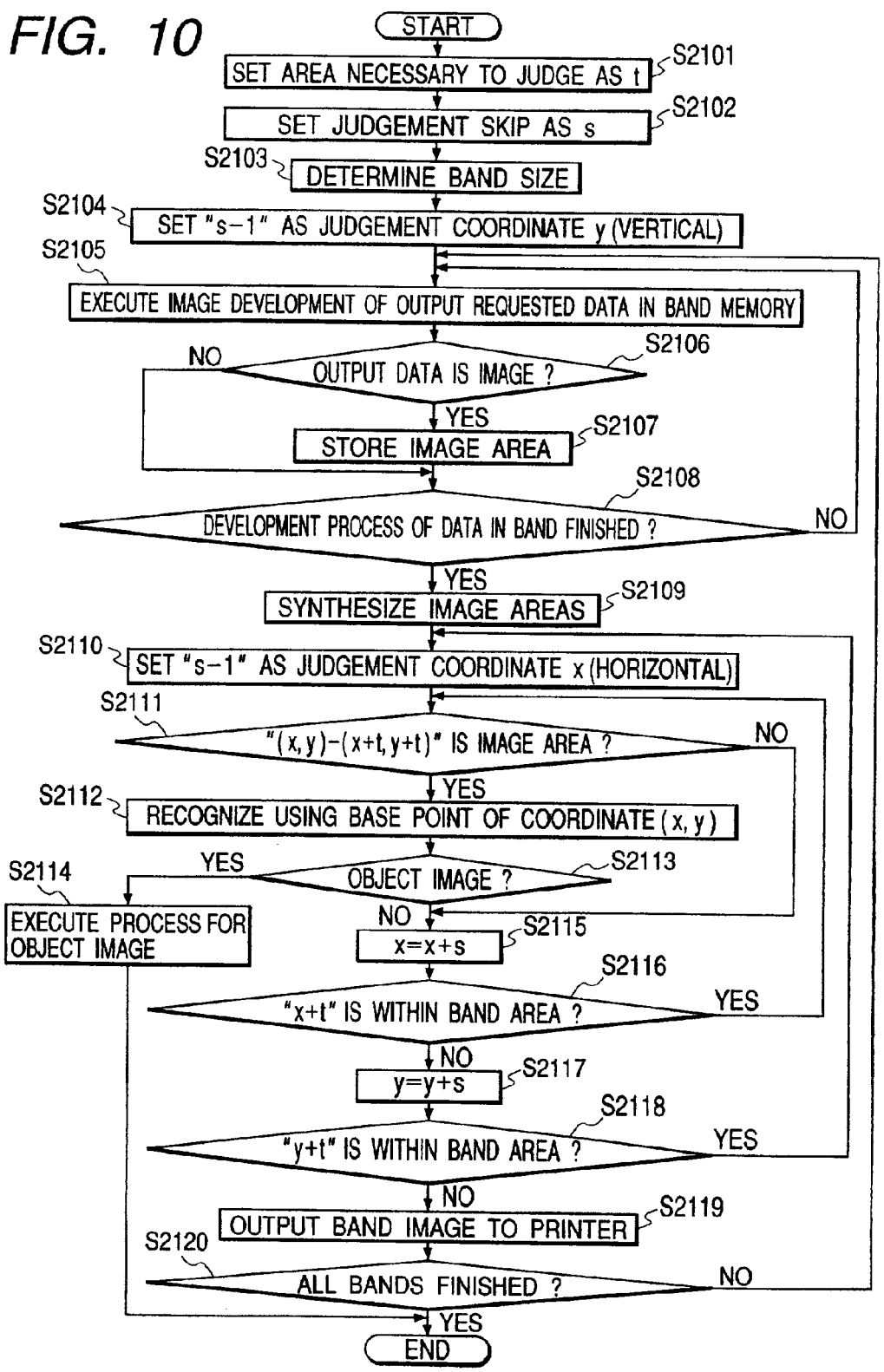
FIG. 10 is a flowchart showing a processing of judging whether the image data developed in the band memory includes the identification information at high speed.

FIG. 10 is a flowchart showing a processing of judging at high speed whether the image data developed in the band memory includes the identification information.

In order to reduce the judgment mistake, the information necessary for the judgment, that is, the aforementioned identification information is periodically included in the entire surface of the judgment object image, and the judgment can be performed from the area of the specific range of the arbitrary place in the image. The area required for the judgment is determined by the judgment module for use. In S2101 the minimum necessary area for judgment is set as t.

When the image developed in the band memory is judged, it is also possible to judge all areas. However, depending upon the judgment module, the judgment can be performed in the partial area of the judgment object image data. In this case, it is also possible to determine a skip s between the areas for performing the judgment for speeding up and perform the judgment for each s. The judgment skip is set as s in S2102.

One example for obtaining the skip s will be described hereinafter.

Figure 13:
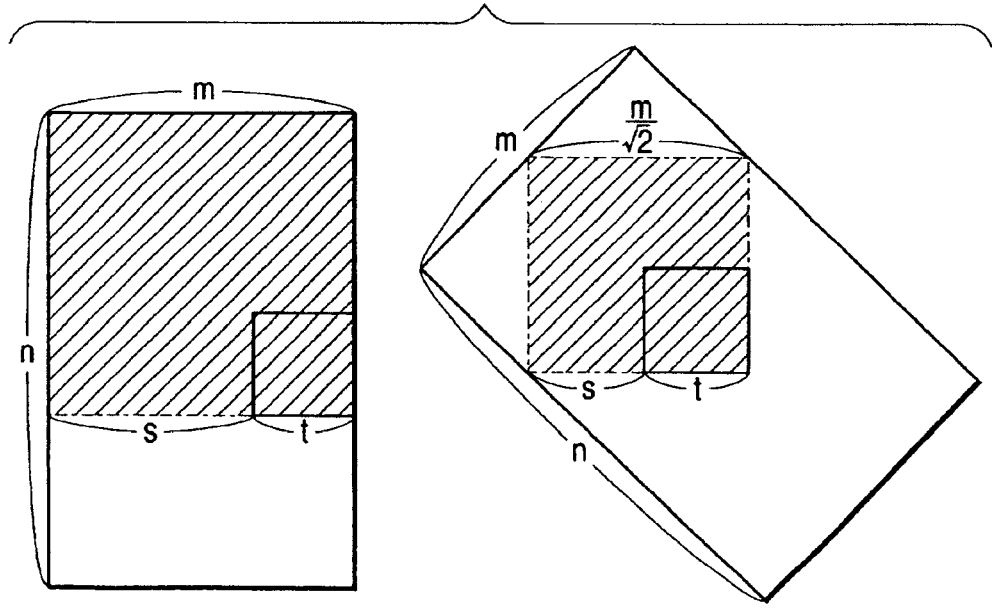
FIG. 13 is a diagram showing one example of the judgment skip.

FIG. 13 is a diagram showing one example of the judgment skip.

The size of the judgment object image is set as m, n (m<=n), and m, n indicate the size of the image to be judged. However, when the identification information is not included in the entire surface of the image as the object, instead of the size of the judgment object image, the size of the area including the identification information is set as m, n.

When it is assumed that the image is placed without being rotated as shown in a left-side diagram of FIG. 13 and only the horizontal direction is considered, the judgment cannot be performed with the base point x1 because the image exists in and beyond the range of x1+1. Therefore, the judgment needs to be performed again between x1+1 and x1+1+m For this, the following is necessary.

$$x1+s+t<=x1+1+m$$

That is to say, the following is necessary.

$$s<=m-t+1$$

Since a larger value of s is effective for speeding up, the following can be obtained.

$$s=m-t+1$$

Similarly in the vertical direction, the following is obtained.

$$s=n-t+1$$

However, from (m<=n), the following results.

$$s=m-t+1$$

However, since there is a possibility that the judgment object image is rotated by the arbitrary angle, the size can be obtained by the following as shown in a right-side diagram of FIG. 13.

$$s=m/\sqrt{2}-t+1$$

Additionally, when there are a plurality of judgment image types and the size differs (e.g., when a plurality of images of 10000 yen, 100 dollars, and the like are judged), the aforementioned resulting minimum value of each judgment image is set as s. Moreover, a much smaller value is sometimes used because of the limitation of the judgment module. When all areas have to be judged, the skip s becomes 1.

Next, in order to avoid the situation in which the judgment area t×t overlaps the band boundary, the image is divided and the judgment becomes impossible, the band size is determined in such a manner that the judgment area t×t does not overlap the band boundary. Since the band size cannot be changed for each band depending upon the system, in S2103, for example, the band size which satisfies the following condition in all bands in the page is determined.

Band boundary<=(s-t)+s*(N-1) (N=the number of bands in page 1, 2, 3)

Alternatively, the following is used.

s*N<=band boundary (N=the number of bands in page 1, 2, 3)

Instead of processing and judging the data of the area t×t at once, the judgment module can sometimes judge a plurality of divided portions. In this case, in accordance with the condition, the judgment standard is changed.

Next, in order to obtain the first judgment coordinate, in S2104 s-1 is set as the initial value y of the vertical direction of the judgment coordinate.

Subsequent steps indicate a band processing. Steps S2105 to S2108 indicate a processing for drawing in the band memory, and S2109 to S2120 indicate a processing of judging and outputting the data of the band memory. The processing is repeatedly performed for each band. Each processing will be described hereinafter.

In S2105, among drawing data of a character, image, diagram, and the like prepared in the application or the like, data pieces belonging to the target band area are extracted one by one and developed with the image in the band memory in accordance with the printer resolution. The data is extracted by any one of the application, OS, and printer driver.

In S2106, it is judged whether the data developed in the band memory in S2105 is image data. This can be judged simply by determining whether the data is a bit map. However, even with the bit map, when it can be judged that the data is a bit map with a small number of colors or is not clearly a judgment object, it is also possible to judge that the data is not an image.

When it is judged in S2106 that the data is an image, the image area is stored in S2107. The image area generally has a rectangular shape. However, a shape other than the rectangular shape is sometimes outputted. In this case, in order to simplify the processing, the rectangular shape including all the areas may be used as the image area. FIG. 14 shows one example of storage information when the image area is stored in the rectangular shape.

It is judged in S2108 whether an image development processing of all data belonging to the target band is finished.

If the development processing of all data is not finished, the processing is continued from S2105.

On the other hand, when it is judged in S2108 that the processing is finished, in order to prepare image area information in a band, the image area belonging in the band stored in S2107 is synthesized in S2109. A synthesizing method differs with an image area form, but as one example, when the rectangular information is stored, and the rectangular shapes even partially overlap each other, the information is regarded as the same image, and the rectangular area including two rectangular shapes can be used as a new rectangular area. Moreover, when the synthesized area cannot cover the judgment object image (the area is smaller in size than the judgment object image, and is not an image of securities or the like), the area is deleted from the image area, and the image area for performing the judgment processing is further reduced so that speeding up can be realized.

Thereafter, in S2110 to S2118, the image in the band is determined.

First in S2110, s−1 is set as the initial value x of the horizontal direction of the judgment coordinate.

It is judged in S2111 whether all the judgment areas (x, y) to (x+t, y+t) using (x, y) as the base point are included in the image area synthesized in S2109.

If it is judged that the area using (x, y) as the base point is the image area, there is a possibility that the area corresponds to the paper money, or the securities, and therefore in S2112 the coordinate (x, y) is used as the base point to perform the judgment.

In S2113 the processing is branched in accordance with a result of S2112.

If as a result of judgment the object image is determined, the processing for the object image is performed in S2114. For example, the message indicating that the printing is impossible is displayed to the user and the print processing is finished. Alternatively, the print processing is performed to output a solid image. Thereafter, the entire processing is finished.

On the other hand, when it is judged in S2113 that the image is not the object image, or when it is judged in S2111 that the area is not the image area, the image indicates no paper money, or no securities, and s is therefore added to x in S2115 to obtain the next coordinate.

It is judged in S2116 whether the output image judgment of the horizontal direction in the vertical direction coordinate y is finished. If the judgment is not finished, the processing is repeated from S2111.

On the other hand, when it is judged that the judgment in the vertical direction coordinate y is finished, the skip s is added to y in S2117 to obtain the next coordinate of the vertical direction. It is judged in S2118 from a result of S2117 whether the output image judgment of the vertical direction is also finished. If the judgment is not finished, the processing is repeated from S2110.

On the other hand, when the vertical direction judgment is also finished, it is determined that the judgment of all output images is finished, and in S2119 the image developed in the band memory is outputted to the printer.

Subsequently, it is judged in S2120 whether all bands are finished. If all the bands are not finished, the processing is repeated from S2105.

On the other hand, when it is judged in S2120 that the processing of all the bands is finished, all processings are finished.

In the present embodiment, after the processing of S2105, the processing of S2106, S2107 is performed. Even when S2105 is performed after S2106, S2107, a similar effect is obtained.

Moreover, in the present embodiment, band division of the vertical direction has been described. However, even when the band is divided in a transverse direction, the judgment can similarly be performed.

Furthermore, when it is judged in S2113 that the image is the object image, the processing is discontinued, but the processing may be continued by changing the image area including the corresponding area to an image indicating another alarm. In this case, the image area in which the image is replaced may be deleted from the image area, and this can obviate necessity of the subsequent judgment.

In S2103, the system in which the band size cannot be changed midway in the page has been described, but in some systems, the band size can be changed midway in the page. In this case, instead of determining the band size in the beginning of the page, it is judged for each band whether the area t×t does not correspond to the band boundary. When the area overlaps the boundary, the judgment can be realized by changing the band size.

The judgment area is successively calculated and it is judged whether the area is the image area. However, even when the judgment is performed with respect to all (s×N−1, s×M−1) to (s×N−1+t, s×M−1+t) (N, M=1,2,3,e) included in the respective image areas synthesized in S2109, the judgment can similarly be performed at high speed.

As described above, since the size (m, n) of the paper money or the securities as the judgment object image is known, the embedding period of the digital watermark information used during judgment of the judgment object image in the judgment object image is known, and the area size (t*t) for obtaining the sufficient judgment precision during judgment of the digital watermark of the judgment object image is experimentally known, the period for the output requested image to judge the digital watermark with the realized sufficient judgment precision (i.e., the period in which at least one area size (t*t) is necessarily extracted from the judgment object image included in the output requested image, when the output requested image is sampled and judged in this period) can be obtained like s.

Therefore, it is possible to use only the image data of the minimum necessary area size and judge whether or not the output requested image includes the judgment object image.

Moreover, when a plurality of judgment object images are simultaneously judged, by using the image data sampled with the maximum area size and minimum period for the respective judgment object images to perform the judgment, the sufficient judgment precision is realized for each of the plurality of judgment object images, and further the judgment is possible at highest speed (with little processing amount).

Furthermore, the judgment object is limited to the image data corresponding to the drawing data excluding the character and diagram having no possibility of being the paper money or the securities, and further the image data in which the area of the bit map having a small number of colors (one, two colors) or the image data formed by developing the drawing data is smaller than that of the paper money or the securities and which is not clearly the paper money or the securities is also excluded from the judgment object, so that high-speed judgment can be realized.

Additionally, there is a possibility that the judgment cannot be performed when the area t*t overlaps the band boundary, but the band width is determined in such a manner that the area t*t does not overlap the band boundary, and the judgment object image can therefore securely be judged.

Moreover, when the band size can be determined, it is judged for each band whether or not the area t*t corresponds to the band boundary, and the band size is changed, so that the judgment object image can be judged with good precision.

For the high-speed (little processing amount) judgment, when algorithm is realized, even in the printer apparatus whose unit cost is low and which cannot employ the judgment of the paper money, securities, and the like by expensive hardware, the judgment of the paper money, securities, and the like can be realized in software of the printer driver or the like whose processing speed is slow but whose cost can be suppressed.

Additionally, since with enhancement of the processing speed of the computer CPU the printer driver processing speed is enhanced, the judgment with higher precision is enabled by shortening the period, enlarging the aforementioned area size, or taking another countermeasure.

The third embodiment includes a judgment unit for judging whether the drawing data is an image data, and a judgment unit for, when as a judgment result of the judgment unit the data is the image data, judging whether or not the image data includes the information indicating that the image is the judgment object image. Therefore, even high-resolution data can efficiently be subjected to the judgment processing and the high-speed processing is enabled.

Other Embodiments of the Invention

A processing method of storing a program for operating the aforementioned embodiment constitution in a storage medium to realize the aforementioned embodiment function, reading the program stored in the storage medium, and executing the present embodiment in a client computer and server computer is also included in a category of the aforementioned embodiment, and the storage medium with the program stored therein is also included in the embodiment.

As such storage medium, for example, a floppy disk, hard disk, optical disk, optomagnetic disk, CD-ROM, magnetic tape, nonvolatile memory card, and ROM can be used.

Moreover, the present invention is not limited to a constitution in which the processing is executed only by the program stored in the storage medium, and a constitution which operates on the OS in cooperation with functions of another software and expanded board to execute the operation of the aforementioned embodiment is also included in the category of the embodiment.

What is claimed is:

1. An image processing apparatus comprising:
judgment means for judging for each of predetermined areas whether or not an output requested image supplied by a unit of a band includes information indicating a judgment object image; and
determination means for determining the predetermined area for each predetermined distance with respect to said output requested image,
wherein the band is set in such a manner that the predetermined area does not form a boundary of the band.

2. An image processing apparatus comprising:
judgment means for judging for each of predetermined areas whether or not an output requested image supplied by a unit of a band includes information indicating a judgment object image; and
determination means for determining the predetermined area for each predetermined distance with respect to said output requested image,
wherein a width of the band can be changed in the output requested image, and the band width is set in such a manner that the predetermined area does not form a boundary of the band.

3. The image processing apparatus according to claim 2, wherein said band width is set by judging whether said predetermined area does not overlap the band boundary.

4. An image processing apparatus comprising:
first judgment means for judging whether or not drawing data is image data; and
second judgment means for, when as a result of judgment by said first judgment means the drawing data is determined to be image data, judging for each of one or more predetermined areas whether or not the image data includes information indicating a judgment object image,
wherein said image data is judged per band, and the band is set in such a manner that a predetermined area for which judging is being performed does not form a boundary of the band.

5. An image processing apparatus comprising:
first judgment means for judging whether or not drawing data is image data; and
second judgment means for, when as a result of judgment by said first judgment means the drawing data is determined to be image data, judging for each of one or more predetermined areas whether or not the image data includes information indicating a judgment object image,
wherein said image data is judged per band, a width of the band can be changed in an output requested image, and the band width is set in such a manner that a predetermined area for which judging is being performed does not form a boundary of the band.

6. The image processing apparatus according to claim 5, wherein said band width is set by judging whether the predetermined area does not overlap the band boundary.

7. An image processing apparatus according to claim 1, wherein the judgment object image is an image of paper money, securities, or other images that are prohibited by law from being printed.

8. An image processing apparatus according to claim 1, wherein the information indicating the judgment object image is a visible or invisible digital watermark.

9. An image processing apparatus according to claim 1, wherein said judgment means is executed by a printer driver.

10. An image processing apparatus according to claim 1, wherein the information indicating the judgment object image is periodically embedded in the judgment object image.

11. An image processing apparatus according to claim 1, wherein said predetermined area is an area necessary for judgment of said judgment object image.

12. An image processing apparatus according to claim 1, wherein when the output requested image is judged for each predetermined distance, the predetermined distance is determined in such a manner that the predetermined area is necessarily once set in the judgment object image.

13. An image processing apparatus according to claim 1, wherein when there are a plurality of judgment object images, the determination means determines a minimum distance among the predetermined distances for the plurality of judgment object image as the predetermined distance.

14. An image processing apparatus according to claim 1, wherein said predetermined distance is determined also by considering that the judgment object image rotates.

15. An image processing method comprising:
a judgment step of judging for each of predetermined areas whether or not an output requested image supplied by a unit of a band includes information indicating a judgment object image; and
a determination step of determining the predetermined area for each predetermined distance with respect to said output requested image,
wherein the band is set in such a manner that the predetermined area does not form a boundary of the band.

16. A storage medium which computer-readably stores a program for causing a computer to execute an image processing method comprising:
a judgment step of judging for each of predetermined areas whether or not an output requested image supplied by a unit of a band includes information indicating a judgment object image; and
a determination step of determining the predetermined area for each predetermined distance with respect to said output requested image,
wherein the band is set in such a manner that the predetermined area does not form a boundary of the band.

17. An image processing apparatus according to claim 4, wherein the judgment object image is an image of paper money, securities, or other images that are prohibited by law from being printed.

18. An image processing apparatus according to claim 4, wherein the information indicating the judgment object image is a visible or invisible digital watermark.

19. An image processing apparatus according to claim 4, wherein said second judgment means is executed by a printer driver.

20. An image processing apparatus according to claim 4, wherein the information indicating the judgment object image is periodically embedded in the judgment object image, and the predetermined area is an area including at least one piece of the information indicating the judgment object image.

21. An image processing apparatus according to claim 4, wherein when said image data comprises an image with a small number of colors, said second judgment means does not perform the judgment.

22. An image processing apparatus according to claim 4, wherein when as the result of the judgment by said first judgment means the drawing data is not the image data, said second judgment means does not perform the judgment.

23. An image processing apparatus according to claim 4, wherein when it is judged as said judgment result that the judgment object image is included, any one of a processing of discontinuing output of an output requested image, a processing of changing the output requested image to another image and outputting the image, and a processing of informing that the output is impossible is performed.

24. An image processing apparatus according to claim 4, wherein said judgment is performed for each predetermined area of the image data, and the predetermined area is determined for each predetermined distance of the image data.

25. An image processing apparatus according to claim 24, wherein when the image data is judged for each predetermined area, the predetermined distance is determined in such a manner that the predetermined area is necessarily once set in the judgment object image.

26. An image processing apparatus according to claim 24, wherein when there are a plurality of judgment object images, a minimum distance among the predetermined distances for the plurality of judgment object images is determined as the predetermined distance.

27. An image processing apparatus according to claim 24, wherein said predetermined distance is determined also by considering that the judgment object image rotates.

28. An image processing apparatus according to claim 4, wherein said judgment is performed after the image data constituting a band is synthesized.

29. An image processing apparatus according to claim 28, wherein when said synthesized image data is smaller than the judgment object image, said judgment is not performed.

30. An image processing apparatus according to claim 5, wherein the judgment object image is an image of paper money, securities, or other images that are prohibited by law from being printed.

31. An image processing apparatus according claim 5, wherein the information indicating the judgment object image is a visible or invisible digital watermark.

32. An image processing apparatus according to claim 5, wherein said second judgment means is executed by a printer driver.

33. An image processing apparatus according to claim 5, wherein the information indicating the judgment object image is periodically embedded in the judgment object image, and the predetermined area is an area including at least one piece of the information indicating the judgment object image.

34. An image processing apparatus according to claim 5, wherein when said image data comprises an image with a small number of colors, said second judgment means does not perform the judgment.

35. An image processing apparatus according to claim 5, wherein when as the result of the judgment by said first judgment means the drawing data is not the image data, said second judgment means does not perform the judgment.

36. An image processing apparatus according to claim 5, wherein when it is judged as said judgment result that the judgment object image is included, any one of a processing of discontinuing output of an output requested image, a processing of changing the output requested image to another image and outputting the image, and a processing of informing that the output is impossible is performed.

37. An image processing apparatus according to claim 5, wherein said judgment is performed for each predetermined area of the image data, and the predetermined area is determined for each predetermined distance of the image data.

38. An image processing apparatus according to claim 37, wherein when the image data is judged for each predetermined area, the predetermined distance is determined in such a manner that the predetermined area is necessarily once set in the judgment object image.

39. An image processing apparatus according to claim 37, wherein when there are a plurality of judgment object images, a minimum distance among the predetermined distances for the plurality of judgment object images is determined as the predetermined distance.

40. An image processing apparatus according to claim 37, wherein said predetermined distance is determined also by considering that the judgment object image rotates.

41. An image processing apparatus according to claim 5, wherein said judgment is performed after the image data constituting a band is synthesized.

42. An image processing apparatus according to claim 41, wherein when said synthesized image data is smaller than the judgment object image, said judgment is not performed.

43. An image processing method comprising:

a first judgment step of judging whether or not drawing data is image data; and a second judgment step of, when as a result of judgment in said first judgment step the drawing data is determined to be image data, judging for each of one or more predetermined areas whether or not the image data includes information indicating a judgment object image, wherein said image data is judged per band, and the band is set in such a manner that a predetermined area for which judging is being performed does not form a boundary of the band.

44. A storage medium which computer-readably stores a program for causing a computer to execute an image processing method comprising:

a first judgment step of judging whether or not drawing data is image data; and a second judgment step of, when as a result judgment in said first judgment step the drawing data is determined to be image data, judging for each of one or more predetermined areas whether or not the image data includes information indicating a judgment object image, wherein said image data is judged per band, and the band is set in such a manner that a predetermined area for which judging is being performed does not form a boundary of the band.

45. An image processing method comprising:

a first judgment step of judging whether or not drawing data is image data; and a second judgment step of, when as a result of judgment in said first judgment step the drawing data is determined to be image data, judging for each of one or more predetermined areas whether or not the image data includes information indicating a judgment object image, wherein said image data is judged per band, a width of the band can be changed in an output requested image, and the band width is set in such a manner that a predetermined area for which judging is being performed does not form a boundary of the band.

46. A storage medium which computer-readably stores a program for causing a computer to execute an image processing method comprising:

a first judgment step of judging whether or not drawing data is image data; and a second judgment step of, when as a result of judgment in said first judgment step the drawing data is determined to be image data, judging for each of one or more predetermined areas whether or not the image data includes information indicating a judgment object image, wherein said image data is judged per band, a width of the band can be changed in an output requested image, and the band width is set in such a manner that a predetermined area for which judging is being performed does not form a boundary of the band.

* * * * *

UNITED STATES PATENT AND TRADEMARK OFFICE
CERTIFICATE OF CORRECTION

PATENT NO. : 7,058,214 B2
APPLICATION NO. : 09/769467
DATED : June 6, 2006
INVENTOR(S) : Yoshiaki Tomomatsu It is certified that error appears in the above-identified patent and that said Letters Patent is hereby corrected as shown below:

COVER PAGE AT ITEM [54]:
Title, "IMAGING" should read --IMAGE--.

COLUMN 1:
Line 2, "IMAGING" should read --IMAGE--.
Line 54, "object," should read --objects,--.
Line 62, "object," should read --objects,--.

COLUMN 2:
Line 4, "object," should read --objects,--.

COLUMN 8:
Line 61, delete "dam".

COLUMN 9:
Line 64, " $x1 + 1 + m$ " should read -- $x1 + 1 + m$.--.

COLUMN 10:
Line 40, "3)" should read --3).--.
Line 43, "3)" should read --3).--.

Signed and Sealed this

Sixth Day of February, 2007

JON W. DUDAS
*Director of the United States Patent and Trademark Office*